(12) United States Patent
Seyffer et al.

(10) Patent No.: US 9,034,444 B2
(45) Date of Patent: May 19, 2015

(54) PAPER AND CARDBOARD PACKAGING WITH BARRIER COATING OF A POLYMER MIXTURE

(75) Inventors: Hermann Seyffer, Heidelberg (DE); Carmen-Elena Cimpeanu, Ludwigshafen (DE); Heiko Diehl, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/483,762

(22) Filed: May 30, 2012

(65) Prior Publication Data
US 2012/0308749 A1  Dec. 6, 2012

Related U.S. Application Data

(60) Provisional application No. 61/491,248, filed on May 30, 2011.

(51) Int. Cl.
*B29D 22/00* (2006.01)
*B32B 29/06* (2006.01)
(Continued)

(52) U.S. Cl.
CPC ............. *B32B 29/06* (2013.01); *B32B 2255/12* (2013.01); *B32B 2553/00* (2013.01);
(Continued)

(58) Field of Classification Search
CPC ............................ B32B 2255/12; B32B 29/06
USPC .................................................. 428/34.2, 34.3
See application file for complete search history.

(56) References Cited

U.S. PATENT DOCUMENTS 5,385,967 A * 1/1995 Bauer et al. .................... 524/458
5,728,249 A   3/1998 Kinsey, Jr. et al.
(Continued)

FOREIGN PATENT DOCUMENTS

DE   44 45 193 A1   7/1995
EP   1 884 594 A1   2/2008
(Continued)

OTHER PUBLICATIONS

Biedermann et al. "Mineral Oil Contents in Paper and Board Recycled to Paperboard for Food Packaging"; Packaging Technology and Science; vol. 24, Issue 2, pp. 61-73; abstract (Mar. 2011); retrieved Jun. 19, 2013; http://onlinelibrary.wiley.com/doi/10.1002/pts.914/abstract?deniedAccessCustomisedMessage=&userIsAuthenticated=false.*

(Continued)

*Primary Examiner* — James Yager
(74) *Attorney, Agent, or Firm* — Oblon, McClelland, Maier & Neustadt, L.L.P.

(57) ABSTRACT

Paper or cardboard packaging produced from recycled paper contaminated by mineral oil, where the packaging includes a barrier layer obtained by applying an aqueous polymeric dispersion containing a mixture of at least two polymers A and B. Polymer A is obtained by emulsion polymerization of C1-C4 alkyl(meth)acrylates, acid monomers, e.g., acrylic acid or methacrylic acid, 0-20 wt % of acrylonitrile and 0-10 wt % of further monomers, where the glass transition temperature of copolymer A is greater than +45° C. and the glass transition temperature of polymer B is less than +10° C. The mean value calculated from the glass transition temperatures of the individual polymers is +10 to +45° C. The barrier layer may be situated on one of the surfaces of the packaging or form one of multiple layers of a multilayered packaging coating or be situated as a coating on one side of an inner bag situated within the packaging.

23 Claims, 1 Drawing Sheet

(51) Int. Cl.
*D21H 27/10* (2006.01)
*D21H 11/14* (2006.01)
*D21H 19/10* (2006.01)
*D21H 19/24* (2006.01)
*D21H 19/30* (2006.01)
*D21H 19/82* (2006.01)
*D21H 21/16* (2006.01)

(52) U.S. Cl.
CPC .............. *D21H 27/10* (2013.01); *D21H 11/14* (2013.01); *D21H 19/10* (2013.01); *D21H 19/24* (2013.01); *D21H 19/30* (2013.01); *D21H 19/82* (2013.01); *D21H 21/16* (2013.01)

(56) References Cited

U.S. PATENT DOCUMENTS

| 5,763,100 | A | 6/1998 | Quick et al. | |
|---|---|---|---|---|
| 6,534,171 | B1* | 3/2003 | Eggers et al. | 428/336 |
| 2006/0072859 | A1* | 4/2006 | Melchoir et al. | 383/64 |
| 2010/0174032 | A1* | 7/2010 | Temple et al. | 524/591 |
| 2014/0141236 | A1* | 5/2014 | Magdassi et al. | 428/332 |

FOREIGN PATENT DOCUMENTS

| GB | 2 433 450 A | 6/2007 |
|---|---|---|
| JP | 2006-28697 A | 2/2006 |
| WO | WO 2006/053849 A1 | 5/2006 |

OTHER PUBLICATIONS

U.S. Appl. No. 14/356,530, filed May 6, 2014, Seyffer, et al.
International Search Report issued Jul. 26, 2012, in PCT/EP2012/059821 filed May 25, 2012.
U.S. Appl. No. 14/360,803, filed May 27, 2014, Seyffer, et al.
U.S. Appl. No. 14/375,937, filed Jul. 31, 2014, Al-Hellani, et al.

* cited by examiner

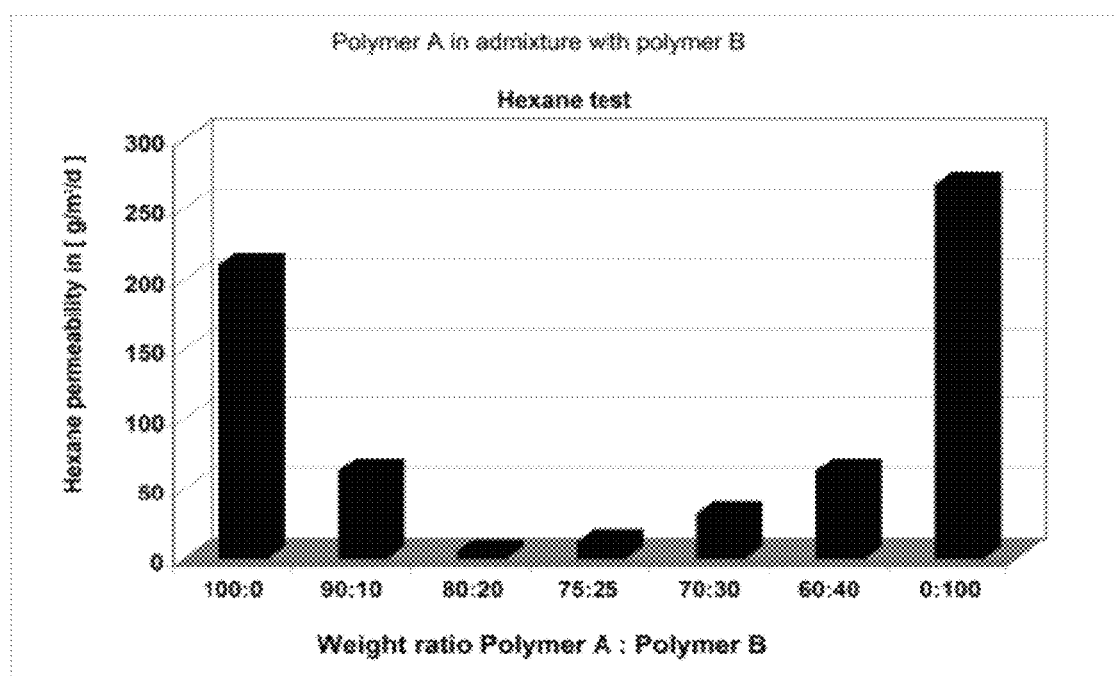

PAPER AND CARDBOARD PACKAGING WITH BARRIER COATING OF A POLYMER MIXTURE

CROSS REFERENCE TO RELATED APPLICATION

The present application claims priority to U.S. Provisional application Ser. No. 61/491,248, filed on May 30, 2011, the text which is hereby incorporated by reference.

The present invention relates to paper or cardboard packaging produced from mineral oil contaminated, recycled paper with a barrier layer obtainable by applying an aqueous polymeric dispersion comprising a polymer mixture of specified polymers having different glass transition temperatures, wherein the mean value calculated from the glass transition temperatures of the individual polymers is in the range from +10 to +45° C. The barrier layer may be situated on one of the surfaces of the packaging, or form one of multiple layers of a multilayered packaging coating or be situated as a coating on one side of an inner bag situated within the packaging.

Paperboard packaging is generally produced from recycled paper. In the case of printed paper, especially newspaper, the recycled paper may contain mineral oil residues from the printing inks typically used to print newspapers. Even at room temperature, volatiles evaporate from these residues and, in the case of food packaging, deposit on the food items packed in the box, for example pasta, semolina, rice or cornflakes. Even most of the inner bags currently used, which are made of polymer film, do not offer adequate protection. Studies carried out by Zurich Cantonal Laboratory detected an appreciable level of mineral oil residues in food items which were packed in packaging produced from recycled paper. The volatile mineral oil constituents are predominantly paraffinic and naphthenic hydrocarbons, known to be a health concern, and aromatic hydrocarbons, especially those of 15-25 carbon atoms.

There is accordingly a need to reduce the risk of food items becoming contaminated with mineral oil residues. One possibility would be to dispense with recycling of newspaper in the production of paperboards for the packaging of food. This is undesirable for ecological reasons and impracticable on account of the insufficient availability of virgin cellulose. Another solution would be to dispense with mineral oils in the printing inks for newsprint. But this comes up against technological obstacles, particularly with regard to the wipe-off resistance of the print on the paper surface. Grease and oil repellent barrier coatings are known in the packaging sector. WO 2006/053849 for example describes coatings based on waterborne polymeric compositions for paper and board. The polymers do show good barrier properties against liquid greasy substances, but it has transpired that this does not necessarily also provide a good barrier effect against substances permeating in gaseous form, since the transport mechanisms for the permeating substances are different. In the case of liquid oils and greases, transportation takes place via the fibers, for which capillary forces and surface wetting play a part. In the case of problems with substances transferring in gaseous form, it is not capillarity and wetting which are important but sorption, diffusion and porosity. In addition, oils and greases differ from hydrocarbons, i.e., from mineral oil constituents, in their polarity and hence in their diffusivity through barrier layers.

It is an object of the present invention to provide packaging which despite use of mineral oil contaminated, recycled paper reduces the risk of packaged contents becoming contaminated with volatile mineral oil constituents.

This object is achieved according to the invention by paper or cardboard packaging produced at least partly from mineral oil contaminated, recycled paper, wherein the packaging includes at least one barrier layer obtainable by applying an aqueous polymeric dispersion comprising a mixture of at least two polymers A and B, wherein polymer A is a copolymer obtainable by emulsion polymerization of
(a) one or more principal monomers selected from the group consisting of C1-C4 alkyl(meth)acrylates,
(b) 0.1 to 5 wt % of one or more acid monomers,
(c) 0-20 wt % of acrylonitrile and
(d) 0 to 10 wt % of further monomers other than the monomers (a) to (c),
wherein the glass transition temperature of polymer A is greater than +45° C.,
and wherein the glass transition temperature of polymer B is smaller than +10° C., wherein the mean value calculated from the glass transition temperatures of the individual polymers is in the range from +10 to +45° C.,
wherein the barrier layer may be situated on one or more of the surfaces of the packaging, or the barrier layer may form at least one of multiple layers of a multilayered packaging coating or the barrier layer may be situated as a coating on at least one side of an inner bag situated within the packaging. The packaging is useful for food in particular.

The glass transition temperature of the individual polymers can be determined by differential scanning calorimetry (ASTM D 3418-08, "midpoint temperature"). The mean glass transition temperature of the polymer mixture to be used according to the present invention can be calculated using the Fox equation. After Fox (T. G. Fox, Bull. Am. Phys. Soc. 1956 [Ser. II] 1, page 123 and according to Ullmann's Encyclopädie der technischen Chemie, vol. 19, page 18, 4$^{th}$ edition, Verlag Chemie, Weinheim, 1980), the reciprocal of the glass transition temperature of uncrosslinked or lightly crosslinked copolymers is given to a good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n constructing the polymers A and B and $T_g^1, T_g^2, T_g^n$ are the glass transition temperatures, in degrees Kelvin, of the homopolymers each constructed of only one of the monomers 1, 2, ... n. The mass fractions are based on the sum total of all monomers from which the polymers A and B of the polymer mixture are constructed.

The $T_g$ values of the homopolymers of most monomers are known and listed for example in Ullmann's Encyclopedia of Industrial Chemistry, vol. 5, A21, page 169, VCH Weinheim, 1992; further sources of glass transition temperatures of homopolymers are for example J. Brandrup, E. H. Immergut, Polymer Handbook, 1$^{st}$ Ed., J. Wiley, New York 1966, 2$^{nd}$ Ed. J. Wiley, New York 1975, and 3$^{rd}$ Ed. J. Wiley, New York 1989).

Mineral oil contaminated is to be understood as meaning that the paper comprises amounts of volatile hydrocarbons, especially volatile paraffins, volatile naphthenes and/or volatile aromatic hydrocarbons having up to 25 carbon atoms, that are detectable by customary methods of analysis. Volatile hydrocarbons are hydrocarbons having up to 25 carbon atoms, for example from 5 to 22 carbon atoms. In one embodiment of the invention, the mineral oil contamination comes from printing inks and comprises volatile paraffins, volatile naphthenes and/or volatile aromatic hydrocarbons.

In what follows, the designation "(meth)acryl ... " and similar designations are used as an abbreviating notation for "acryl ... or methacryl ... ".

The polymeric dispersions to be used according to the invention are dispersions of polymers in an aqueous medium. An aqueous medium may be for example completely ion-free water or else a mixture of water with a miscible solvent such as methanol, ethanol, or tetrahydrofuran. Preferably, no organic solvents are used. The solids contents of the dispersions are preferably in the range from 15 to 75 wt %, more preferably in the range from 40 to 60 wt % and more particularly above 50 wt %. The solids content can be set for example through appropriate adjustment of the water quantity used in the emulsion polymerization and/or of the monomer quantities. The median size of the polymer particles dispersed in the aqueous dispersion is preferably below 400 nm and more particularly below 300 nm. The median particle size is more preferably between 70 and 250 nm or between 80 and 150 nm. Median particle size here refers to the $d_{50}$ value of the particle size distribution, i.e., 50 wt % of the total mass of all particles have a particle diameter smaller than the $d_{50}$ value. The particle size distribution can be determined in a known manner using an analytical ultracentrifuge (W. Mächtle, Makromolekulare Chemie 185 (1984), pages 1025-1039). The pH of the polymer dispersion is preferably set to above pH 4 especially to a pH between 5 and 9.

The copolymers A to be used according to the present invention are emulsion polymers obtainable by emulsion polymerization of free-radically polymerizable monomers. The copolymer A is formed from one or more principal monomers (a), which are selected from the group consisting of $C_1$-$C_4$ alkyl(meth)acrylates. The principal monomers (a) are preferably used at not less than 70 wt % and more preferably at not less than 75 wt %, for example from 79.5 to 99.5 wt %, based on the sum total of all monomers. Principal monomers (a) are for example methyl acrylate, methyl methacrylate, ethyl acrylate and n-butyl acrylate. Particularly preferred principal monomers (a) are methyl acrylate, methyl methacrylate and their mixture.

The Copolymer a is Formed from One or More Acid Monomers (b).

Acid monomers are ethylenically unsaturated free-radically polymerizable monomers with at least one acid group, for example monomers with carboxylic acid, sulfonic acid or phosphonic acid groups. Carboxylic acid groups are preferred. Acrylic acid, methacrylic acid, itaconic acid, maleic acid or fumaric acid is suitable for example. The acid monomers (b) are preferably selected from acrylic acid and methacrylic acid. The acid monomers (b) are used at 0.1 to 5 wt % and preferably at 0.5 to 5 wt %, based on the sum total of all monomers.

The copolymer A may optionally be formed of acrylonitrile as further monomer (c) at 0 to 20 wt %, based on the sum total of all monomers. In one embodiment of the invention, the copolymer A is formed from acrylonitrile at 1-20 wt % and preferably 2-20 wt %.

The copolymer A can optionally be formed of further monomers (d) other than the monomers (a) to (c). The amount of further monomers (d) is 0 to 10 wt % or 0 to 5 wt %, based on the sum total of all monomers. One embodiment utilizes from 0.1 to 10 wt % or from 0.1 to 5 wt % of further monomers (d). Another embodiment utilizes no further monomers other than the monomers (a) to (c).

The further monomers (d) may be selected from the group consisting of $C_5$-$C_{20}$ alkyl(meth)acrylates, vinyl esters of carboxylic acids comprising up to 20 carbon atoms, vinylaromatics having up to 20 carbon atoms, ethylenically unsaturated nitriles other than acrylonitrile, vinyl halides, vinyl ethers of alcohols comprising 1 to 10 carbon atoms, aliphatic hydrocarbons having 2 to 8 carbon atoms and one or two double bonds, or mixtures thereof. $C_5$-$C_{10}$ Alkyl methacrylates, such as 2-ethylhexyl acrylate, are suitable for example. Mixtures of alkyl(meth)acrylates are also suitable in particular. Vinyl esters of carboxylic acids having 1 to 20 carbon atoms are for example vinyl laurate, vinyl stearate, vinyl propionate, vinyl versatate and vinyl acetate. Useful vinylaromatic compounds include vinyltoluene, a-methylstyrene, p-methylstyrene, alpha-butylstyrene, 4-n-butylstyrene, 4-n-decylstyrene and preferably styrene. Methacrylonitrile is an example of nitriles. Vinyl halides are chlorine, fluorine or bromine-substituted ethylenically unsaturated compounds, preferably vinyl chloride and vinylidene chloride. Vinyl methyl ether and vinyl isobutyl ether are examples of suitable vinyl ethers. Preference is given to vinyl ethers of alcohols comprising 1 to 4 carbon atoms. As hydrocarbons having 4 to 8 carbon atoms and two olefinic double bonds there may be mentioned butadiene, isoprene and chloroprene. $C_5$ to $C_{10}$ alkyl acrylates and methacrylates and vinylaromatics, especially styrene and mixtures thereof are preferred as further monomers (d). n-Hexyl acrylate, octyl acrylate and 2-ethylhexyl acrylate, 2-propylheptyl acrylate, styrene and also mixtures thereof are very particularly preferred. Further monomers (d) also include for example hydroxyl-containing monomers, especially $C_1$-$C_{10}$ hydroxyalkyl(meth)acrylates and also (meth)acrylamide. Useful further monomers (d) further include phenyloxyethyl glycol mono(meth)acrylate, glycidyl acrylate, glycidyl methacrylate, amino(meth)acrylates such as 2-aminoethyl(meth)acrylate. Crosslinking monomers may also be mentioned as further monomers (d).

In one embodiment of the invention, the copolymer A is obtainable from (a) 7-9.5 to 99.5 wt % of one or more principal monomers selected from the group consisting of $C_1$-$C_4$ alkyl(meth)acrylates, (b) 0.5 to 5 wt % of one or more acid monomers selected from acrylic acid and methacrylic acid, (c) 0-20 wt % of acrylonitrile, and no further monomers other than the monomers (a) to (c).

The monomers of copolymer A are adapted in terms of type and amounts such that the glass transition temperature of the emulsion polymer is above 45° C. and is preferably in the range from 46 to 80° C.

The polymers B to be used according to the invention may be emulsion polymers obtainable by emulsion polymerization of free-radically polymerizable monomers. The polymer B may be formed of so-called principal monomers selected from $C_1$ to $C_{20}$ alkyl(meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, or mixtures thereof. $C_1$-$C_{10}$ Alkyl methacrylates, such as methyl methacrylate, methyl acrylate, n-butyl acrylate, ethyl acrylate, isopropylheptyl acrylate and 2-ethylhexyl acrylate, are suitable for example. Mixtures of alkyl(meth)acrylates are also suitable in particular. Vinyl esters of carboxylic acids having 1 to 20 carbon atoms are for example vinyl laurate, vinyl stearate, vinyl propionate, vinyl versatate and vinyl acetate. Useful vinylaromatic compounds include vinyltoluene, α-methylstyrene, p-methylstyrene, α-butyl-styrene, 4-n-butylstyrene, 4-n-decylstyrene and preferably styrene. Acrylonitrile and methacrylonitrile are examples of nitriles. Vinyl halides are chlorine-, fluorine- or bromine-substituted ethylenically unsaturated compounds, preferably vinyl chloride and vinylidene chloride. Vinyl methyl ether and vinyl isobutyl ether are examples of suitable vinyl ethers. Preference is given to vinyl ethers of alcohols comprising 1 to 4 carbon atoms. As hydrocarbons having 2 to 8 carbon atoms and one or two olefinic double bonds there may be mentioned ethylene, propylene, butadiene, isoprene and chloroprene. Especially to $C_8$ alkyl acrylates, C1 to C8 alkyl methacrylates, vinylaromatics, especially styrene, and mixtures thereof are preferred as principal monomers. Very particular preference is given to methyl acrylate, methyl methacrylate, ethyl acrylate, n-butyl acrylate, n-hexyl acrylate, octyl acrylate and 2-ethylhexyl acrylate, styrene and also mixtures thereof. The polymer is preferably a polyacrylate. A polyacrylate is a polymer constructed of $C_1$ to $C_{20}$ alkyl(meth)acrylates at altogether not less than 50 wt % and preferably not less than 70 wt % (all weight percentages are based on the polymer).

In addition to the above principal monomers, the polymer may comprise further monomers. Possibilities include for example monomers with hydroxyl groups, especially hydroxyalkyl(meth)acrylates, (meth)acrylamide or glycidyl (meth)acrylate; also suitable are crosslinking monomers with two or more reactive groups, preferably ethylenically unsaturated, polymerizable groups, for example allyl(meth)acrylate, diacrylates, such as butanediol diacrylate. Monomers with acid groups or acid anhydride groups (acid monomers for short) may be mentioned in particular, examples being monomers with carboxylic acid, sulfonic acid or phosphonic acid groups. Carboxylic acid groups or anhydrides thereof are preferred. Acrylic acid, methacrylic acid, itaconic acid, maleic acid, maleic anhydride and fumaric acid may be mentioned for example. More particularly, the polymer may comprise acid monomers in amounts of 0.1 to 10, more preferably 0.1 to 5 and most preferably 0.2 to 3 wt %, based on the polymer.

Preferred polymers B are polyacrylates constructed of
(a) 50 to 90 wt % and preferably 70 to 90 wt % of acrylate monomers selected from the group consisting of $C_1$-$C_{20}$ alkyl(meth)acrylates and preferably $C_1$-$C_{10}$ alkyl(meth)acrylates;
(b) 0.1 to 10 wt % and preferably 1 to 5 wt % of one or more acid monomers, preferably acrylic acid, methacrylic acid or their mixture;
(c) 0 to 20 wt % and preferably 5 to 20 wt % of vinylaromatics, e.g., styrene;
(d) 0 to 20 wt % and preferably 5 to 20 wt % of (meth)acrylonitrile, preferably acrylonitrile, and
(e) 0 to 10 wt % of further monomers other than the monomers (a) to (d).

Preferred polymers B are also polystyrene acrylates constructed of
(a) 50 to 90 wt % and preferably 70 to 90 wt % of acrylate monomers selected from the group consisting of $C_1$-$C_{20}$ alkyl(meth)acrylates and preferably $C_1$-$C_{10}$ alkyl(meth)acrylates;
(b) 0.1 to 10 wt % and preferably 1 to 5 wt % of one or more acid monomers, preferably acrylic acid, methacrylic acid or their mixture;
(c) 5 to 20 wt % of styrene;
(d) 0 to 20 wt % and preferably 5 to 20 wt % of (meth)acrylonitrile, preferably acrylonitrile, and
(e) 0 to 10 wt % of further monomers other than the monomers (a) to (d).

The monomers of polymer B are adapted in terms of type and amounts such that the glass transition temperature of the emulsion polymer is smaller than +10° C. and preferably is in the range from −10 to 9° C.

Polymers A and B may be obtained by emulsion polymerization, in which case an emulsion polymer is concerned. An emulsion polymerization generally utilizes ionic and/or nonionic emulsifiers and/or protective colloids/stabilizers as surface-active compounds to augment monomer dispersion in the aqueous medium. Protective colloids are polymeric compounds which on solvation bind large amounts of water and are capable of stabilizing dispersions of water-insoluble polymers. Unlike emulsifiers, they generally do not lower the surface tension between polymer particles and water. A detailed description of suitable protective colloids is found in Houben-Weyl, Methoden der organischen Chemie, volume XIV/1, Makromolekulare Stoffe, Georg-Thieme-Verlag, Stuttgart, 1961, pages 411 to 420. Useful protective colloids include for example amphiphilic polymers, i.e., polymers having hydrophobic and hydrophilic groups. Natural polymers, such as starch, or synthetic polymers may be concerned. Useful emulsifiers include both anionic and nonionic surface-active substances the number average molecular weight of which is typically below 2000 g/mol or preferably below 1500 g/mol, while the number average molecular weight of protective colloids is above 2000 g/mol, for example in the range from 2000 to 100 000 g/mol and more particularly in the range from 5000 to 50 000 g/mol. Anionic and nonionic emulsifiers are preferably used as surface-active substances. Suitable emulsifiers are for example ethoxylated $C_8$-$C_{36}$ fatty alcohols having a degree of ethoxylation in the range from 3 to 50, ethoxylated mono-, di- and tri-$C_4$-$C_{12}$-alkylphenols having a degree of ethoxylation in the range from 3 to 50, alkali metal salts of dialkyl esters of sulfosuccinic acid, alkali metal and ammonium salts of $C_8$-$C_{12}$ alkyl sulfates, alkali metal and ammonium salts of $C_{12}$-$C_{18}$ alkylsulfonic acids and alkali metal and ammonium salts of $C_9$-$C_{18}$ alkylarylsulfonic acids. When emulsifiers and/or protective colloids are (co)used as auxiliaries for dispersing the monomers, the amounts used thereof are for example in the range from 0.1 to 5 wt %, based on the monomers. Trade names of emulsifiers are for example Dowfax®2 A1, Emulan® NP 50, Dextrol® OC 50, Emulgator 825, Emulgator 825 S, Emulan®OG, Texapon® NSO, Nekanil® 904 S, Lumiten® I-RA, Lumiten® E 3065, Lumiten® ISC, Disponil® NLS, Disponil LDBS 20, Disponil® FES 77, Lutensol AT 18, Steinapol VSL, Emulphor NPS 25. The surface-active substance is typically used in amounts of 0.1 to 10 wt %, based on the monomers to be polymerized.

The emulsion polymerization temperature is generally in the range from 30 to 130° C. and preferably in the range from 50 to 90° C. The polymerization medium may consist of water only but also of mixtures of water with miscible liquids such as methanol. It is preferable to use just water. The emulsion polymerization may be carried out not only as a batch operation but also in the form of a feed stream addition process, including staged or gradient mode. Preference is given to the feed stream addition process wherein a portion of the polymerization batch is initially charged, heated to the polymerization temperature, incipiently polymerized and subsequently admixed with the rest of the polymerization batch continuously or else stagewise, typically via two or more spatially separated feed streams of which one or more comprise the monomers in pure or emulsified form.

The emulsion polymerization process may utilize the customary known assistants, for example water-soluble initiators and chain transfer agents. Water-soluble initiators for an emulsion polymerization are for example ammonium or alkali metal salts of peroxydisulfuric acid, e.g. sodium peroxodisulfate, hydrogen peroxide or organic peroxides, for example tert-butyl hydroperoxide. Redox (reduction-oxidation) initiator systems are also suitable. Redox initiator systems consist of one or more than one usually inorganic reducing agent and one or more than one organic or inorganic oxidizing agent. The oxidizing component comprises for example the abovementioned initiators for an emulsion polymerization. The reducing components are for example alkali metal salts of sulfurous acid, e.g., sodium sulfite, sodium hydrogensulfite, alkali metal salts of disulfurous acid such as sodium disulfite, bisulfite addition compounds of aliphatic aldehydes and ketones, such as acetone bisulfite or reducing agents such as hydroxymethane-sulfinic acid and salts thereof, or ascorbic acid. The redox initiator systems may be used together with soluble metal compounds where the metallic component can exist in two or more valency states. Customary redox initiator systems are for example ascorbic acid/iron(II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing component, can also be mixtures, for example a mixture of the sodium salt of hydroxymethanesulfinic acid and sodium disulfite. The compounds mentioned are usually used in the form of aqueous solutions, the lower concentration being determined by the water quantity tolerable in the dispersion and the upper concentration by the solubility in water of the compound in question. In general, the concentration is in the range from 0.1 to 30 wt %, preferably 0.5 to 20 wt % and more preferably 1.0 to 10 wt %, based on the solution. The amount of initiators is generally in the range from 0.1 to 10 wt % and preferably in the range from 0.5 to 5 wt %, based on the monomers to be polymerized. Two or more different initiators can also be used in an emulsion polymerization. To remove the residual monomers, the initiator is typically also added after the actual emulsion polymerization has ended.

Chain transfer agents may be used in the polymerization, for example in amounts of 0 to 0.8 part by weight, based on 100 parts by weight of the monomers to be polymerized, which reduces the molar mass. Suitable chain transfer agents include for example compounds having a thiol group such as tert-butyl mercaptan, mercaptoethyl propionate, 2-ethylhexyl thioglycolate, ethyl thioglycolate, mercaptoethanol, mercaptopropyltrimethoxysilane, n-dodecyl mercaptan, or tert-dodecylmercaptan. It is further possible to use chain transfer agents without thiol group, for example terpinolene. In one preferred embodiment, the emulsion polymer has been prepared using from 0.05 to 0.5 wt %, based on the monomer quantity, of at least one chain transfer agent.

The polymer dispersion used for coating the packaging may consist solely of the emulsion polymers dispersed in water for the purpose according to the invention. However, the polymer dispersion in question may also comprise further added substances, for example fillers, antiblocking agents, dyes, flow control agents or thickeners.

In one embodiment of the invention, the polymer mixture of polymers A and B are used in combination with up to 1 part by weight of platelet-shaped pigments, based on 1 part by weight of polymers. Examples of platelet-shaped pigments are talc, clay or mica (glimmer). Talc is preferred. Preferred shape factors (ratio of length to thickness) are above 10.

The coating of polymer dispersion on the substrate acts as a barrier layer. A particularly effective barrier layer is obtained by using a copolymer whereby a coating with the copolymer has a permeability to gaseous n-hexane of less than 50 g/m$^2$ d, preferably of less than 10 g/m$^2$ d, and more preferably less than 5 g/m$^2$ d or less than 1 g/m$^2$ d at 23° C. and a coat weight of 20-25 g/m$^2$ on paper (see method of measurement in the examples described hereinbelow).

The total level of polymers in the dispersion used for coating is preferably at least 1 wt % and more particularly at least 5 wt % and up to 60 or up to 75 wt %. Preferably, the total level of polymers in aqueous dispersion is in the range from 15 to 75 wt %, or in the range from 40 to 60 wt %. Preferred aqueous polymeric dispersions have a viscosity of 10 to 150 000 mPas, or 200 to 5000 mPas (measured with a Brookfield viscometer at 20° C., 20 rpm, spindle 4) at pH 4 and 20° C. The median particle size of the corpuscles of polymer which are dispersed in the aqueous dispersion is for example from 0.02 to 100 µm, and preferably 0.05 to 10 µm. It can be determined using for example optical microscopy, light scattering or freeze fracture electron microscopy.

According to the invention, the carrier substrates are coated with an aqueous polymeric dispersion described above. Suitable substrates are in particular paper, cardboard and polymeric film/sheet. The dispersions used for coating may comprise further added or auxiliary substances, for example thickeners to set the rheology, wetting auxiliaries or binders.

To use the coating composition, it is applied to paper, cardboard or a polymeric carrier film/sheet on coating machines for example. When webs are used, the polymer dispersion is typically applied from a trough via an application roll and leveled using an air brush. Other ways to apply the coating include for example the reverse gravure process, spraying processes or a roller blade or other coating processes known to a person skilled in the art. The carrier substrate has been coated on at least one side, i.e., it may have been coated one-sidedly or both-sidedly. Preferred application processes for paper and cardboard are curtain coating, air blade, bar coating or blade coating. Preferred application processes for film/sheet coating are blade, wire-wound bar, airbrush, counterrotating roll application processes, counterrotating gravure coating, casting head or nozzle.

The amounts applied to the sheetlike materials are preferably in the range from 1 to 10 g (of polymer solids) per m$^2$, preferably from 2 to 7 g/m$^2$ in the case of polymeric film/sheet or preferably from 5 to 30 g/m$^2$ in the case of paper or cardboard. After the coating compositions have been applied to the carrier substrates, the solvent/water is evaporated. For this, in the case of a continuous process, the material may be led through a dryer duct, which may be equipped with an infrared irradiating device, for example. Thereafter, the coated and dried material is led over a chill roll and finally wound up. The thickness of the dried coating is preferably at least 1 µm, more particularly in the range from 1 to 50 µm and more preferably in the range from 2 to 30 µm or from 5 to 30 µm.

The barrier layer may be situated on at least one of the surfaces of the packaging. It may also form at least one of multiple layers of a multilayered packaging coating, or it may be situated as a coating on at least one side of an inner bag within the packaging. The barrier coating may be applied directly to a surface of the carrier material; however, still other layers may be situated between the carrier and the barrier coating, for example primer layers, further barrier layers or colored or black and white printing ink layers. The barrier layer is preferably situated on the inner side of the packaging, the side which faces the packaged contents.

The inner bag is preferably made of a polymeric film/sheet. The material of the inner bag is preferably selected from polyolefins, preferably polyethylene or oriented polypropylene, while the polyethylene may have been produced not only by the high pressure polymerization process but also by the low pressure polymerization process of ethylene. To still further improve adherence to film/sheet, the carrier film/sheet may first be subjected to a corona treatment. Other suitable carrier films/sheets are for example films/sheets of polyester, such as polyethylene terephthalate, films/sheets of polyamide, polystyrene and polyvinyl chloride. In one embodiment, the carrier material comprises biodegradable films/sheets, for example of biodegradable aliphatic-aromatic copolyesters and/or polylactic acid, for example Ecoflex® or Ecovio® film/sheet. Suitable copolyesters are formed for example of alkanediols, especially C2 to C8 alkanediols such as, for example, 1,4-butanediol, of aliphatic dicarboxylic acids, especially C2 to C8 dicarboxylic acids such as, for example, adipic acid or of aromatic dicarboxylic acids such as terephthalic acid for example.

The thickness of carrier films/sheets is generally in the range from 10 to 200 μm.

To obtain specific surficial or coating properties for the films/sheets and packaging media, for example good printability, still better barrier or blocking behavior, good water resistance, it may be advantageous for the coated substrates to be overcoated with covering layers that additionally confer these desired properties, or for the barrier coating to be subjected to a corona treatment. The substrates which have been precoated according to the invention exhibit good overcoatability. Overcoating can again be done using one of the processes recited above, or simultaneous multiple coating can be done, for example by using a curtain coater, in a continuous operation without intermediary winding and unwinding of the film/sheet or paper for example. The barrier layer according to the invention is thereby situated in the interior of the system, and the covering layer then determines the surficial properties. The covering layer has good adherence to the barrier layer.

The invention also provides a process for producing packaging, which process comprises a composition in the form of an above-described aqueous polymeric dispersion being provided and applied to a packaging substrate or to the surface of an inner bag and dried, wherein the aqueous polymeric dispersion comprises at least the above-described polymers A and B and may optionally comprise further polymers.

The invention also provides for the use of an aqueous polymeric dispersion comprising at least the above-described polymers A and B for producing a barrier layer against volatile mineral oil constituents, more particularly for producing packaging, more particularly food packaging.

The substrates coated according to the invention exhibit an outstanding barrier performance against volatile mineral oil constituents. The coated substrates as such can be used as packaging media. The coatings have very good mechanical properties and exhibit good blocking behavior for example.

FIG. 1 is a graphic depicting the barrier effect of certain polymeric mixtures.

EXAMPLES

Unless the context suggests otherwise, percentages are by weight. A reported content relates to the content in aqueous solution or dispersion.

The following input materials were used:
DINP diisononyl phthalate
MMA methyl methacrylate
MA methyl acrylate
AS acrylic acid
S styrene
nBA n-butyl acrylate
AN acrylonitrile
Bu butadiene
Test for Fat Barrier A 10×10 cm sheet of blotting paper was coated with the particular polymer and contacted with a test fat or oil (2 ml of oleic acid for example). The area of the field soaked through with fat is measured after up to 16 hours at 60° C. Strikethrough is assessed after x hours, depending on quality.
Barrier Test Against Gaseous Mineral Oil Constituents (Test Method 1)

The following were packed on top of each other:
1. donor: 30 g/m² paper laden with 1% of Gravex 913 mineral oil for printing inks (Shell)
2. spacer paper to prevent any wetting contact, 30 g/m²
3. barrier material to be tested
4. acceptor: commercial PE film 20 μm, LLDPE of density 0.915 g/cm³

This pack (basal dimensions 10×10 cm) was wrapped with aluminum foil on all sides.

The test system was stored at 60° C. and analyzed by periodically cutting off a strip of the acceptor film, extracting with n-hexane for 2 h at 25° C. and using online HPLC-GC to measure the level of mineral oil constituents having 15-25 carbon atoms. The breakthrough time for the mineral oil constituents to break through the barrier material was determined. The breakthrough time is the time whereafter mineral oil constituents above the detection limit are first detected in the extract.
Barrier Test Against Gaseous Mineral Oil Constituents (Test Method 2)

9 ml of hexane are poured into a vessel containing a sponge and closed with a lid which has an opening and a sealing ring (internal diameter 63 mm). The opening is tightly closed with the barrier material to be tested, while the barrier material does not come into contact with the hexane-drenched sponge. The weight decrease of the vessel is measured. The weight decrease is a measure of the hexane exiting through the barrier material via the gas phase, and thus is a measure of the barrier performance against gaseous mineral oil constituents. The weight decrease in grams is converted to 1 m² of paper area and then reported as g/m² d.

Example 1

Comparative Test of Fat Barrier/Barrier Against Gaseous Mineral Oil Constituents Barrier performance against fats and oils, i.e., against fatty acids and fatty acid esters (fat barrier) and the barrier against gaseous mineral oil constituents, i.e., against volatile hydrocarbons (mineral oil barrier hereinbelow) were tested by test 1 for the polymers listed in table 1. The results are summarized in table 1.

TABLE 1

Barrier performances of certain polymers

| Polymer | Test fat/oil | Fat barrier | Mineral oil barrier |
| --- | --- | --- | --- |
| amorphous aromatic-aliphatic polyester-polyurethane | DINP | + no penetration | − breakthrough < 4 d |
| partly crystalline aliphatic polyester-polyurethane | DINP | + no penetration | − breakthrough < 4 d |

TABLE 1-continued

Barrier performances of certain polymers

| Polymer | Test fat/oil | Fat barrier | Mineral oil barrier |
|---|---|---|---|
| MMA/MA/AS copolymer Tg ca. 50° C. | DINP oleic acid | − area partially saturated with fat | + no penetration |
| partly crystalline aromatic-aliphatic polyester-polyurethane | DINP | + no penetration | − breakthrough < 4 d |
| polyethylene film | DINP oleic acid | + no penetration | − breakthrough < 1 d |
| S/nBA/AN/AS copolymer, Tg 5° C. | oleic acid | + no penetration | − breakthrough < 4 d |
| S/butadiene/AS copolymer, Tg 20° C. | oleic acid | − fully saturated with fat | − no hexane barrier (test 2) |

The results show that coatings having a fat barrier effect do not necessarily have any efficacy as barrier against gaseous mineral oil constituents.

Example 2

Preparation of Polymer Dispersions

Purge a reactor with nitrogen and add 450.0 g of demineralized water and 3.0 g of emulsifier (Disponil® LDBS 20, 20% in water) as initial charge. The mixture in the initial charge is heated to 70-90° C. Then, 21.43 g of sodium peroxodisulfate (7% strength) are added before stirring for 50 minutes. Meter the emulsion feed consisting of 240.0 g of water, 26.67 g of emulsifier (Dowfax 2A1, 45% in water) and 600.0 g of monomer mixture as per table 2 into the reactor over 2 hours. After the emulsion feed has ended allow the system to polymerize for 45 min. The reactor is then cooled down to room temperature.

Solids content: about 45%

TABLE 2

Copolymer compositions, quantities in wt %

| Example | Monomers | Tg [° C.] |
|---|---|---|
| A | 55% MA/44% MMA/1% AS | about 50 |
| B | 14% S/69% nBA/14% AN/3% AS | 5 |

Example 3

Comparative Test of Barrier Against Gaseous Mineral Oil Constituents

Various barrier materials were tested for barrier performance against gaseous mineral oil constituents using test method 2. The results are summarized in table 3.

TABLE 3

Barrier performances of certain polymer mixtures

| Example | Polymer ratio A:B [parts by weight] | Tg mean value [° C.] | Hexane permeation [g m² d] |
|---|---|---|---|
| 3-1 | 100:0 | ca. 50 | 209 |
| 3-2 | 90:10 | 37 | 62 |
| 3-3 | 80:20 | 32 | 5 |
| 3-4 | 75:25 | 30 | 12 |
| 3-5 | 70:30 | 28 | 31 |
| 3-6 | 60:40 | 23 | 62 |
| 3-7 | 0:100 | 5 | 268 |

The results depicted in graphic form in FIG. 1 show that the inventive examples 3-2 to 3-6 (polymer mixtures) have distinctly improved barrier properties against gaseous mineral oil constituents compared with examples 3-1 and 3-7 featuring the straight polymers.

We claim:

1. Paper or cardboard packaging produced at least partly from recycled paper contaminated with mineral oil, wherein the packaging comprises at least one barrier layer obtained by applying an aqueous polymeric dispersion comprising a mixture of at least two polymers A and B, wherein polymer A is a copolymer obtained by emulsion polymerization of:
   (a) one or more principal monomers that are $C_1$-$C_4$ alkyl (meth)acrylates,
   (b) 0.1 to 5 wt % of one or more acid monomers,
   (c) 0-20 wt % of acrylonitrile and
   (d) 0 to 10 wt % of a further monomer other than the monomers (a) to (c),
   polymer B is a copolymer obtained by emulsion polymerization of one or more principal monomers selected from $C_1$ to $C_{20}$ alkyl(meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, and optionally, other monomers copolymerizable therewith,
   wherein a glass transition temperature of polymer A is greater than +45° C., a glass transition temperature of polymer B is less than +10° C., and a mean value calculated from the glass transition temperatures of the individual polymers is in a range from +10 to +45° C.,
   wherein the mineral oil contamination comprises a printing ink comprising at least one selected from the group consisting of a volatile paraffin, a volatile naphthene and a volatile aromatic hydrocarbon,
   wherein
   the barrier layer is situated on one or more surfaces of the packaging,
   the barrier layer is at least one layer of multiple layers of a multilayered packaging coating, or
   the barrier layer is situated as a coating on at least one side of an inner bag situated within the packaging, and
   wherein the coating has a permeability to gaseous n-hexane of less than 50 g/m² d at 23° C.

2. The packaging of claim 1, wherein polymer A comprises, in reacted form, at least 70 wt % of the one or more principal monomers (a).

3. The packaging of claim 1, wherein the one or more principal monomers (a) are selected from the group consisting of methyl acrylate and methyl methacrylate.

4. The packaging of claim 1, wherein the polymer A is obtained by emulsion polymerization of:
   (a) 79.5 to 99.5 wt % of one or more principal monomers that are $C_1$-$C_4$ alkyl(meth)acrylates,
   (b) 0.5 to 5 wt % of one or more acid monomers selected from acrylic acid and methacrylic acid,
   (c) 0-20 wt % of acrylonitrile, and
   no further monomers other than the monomers (a) to (c).

5. The packaging of claim 1, wherein the mean value calculated from the glass transition temperatures of the individual polymers is in a range from +15 to +40° C.

6. The packaging of claim 1, wherein the glass transition temperature of polymer A is in a range from 46 to 80° C., the glass transition temperature of polymer B is in a range from −10 to +9° C., and a quantitative ratio of polymers A and B is such that the mean value calculated from the glass transition temperatures of the individual polymers is in a range from +15 to +40° C.

7. The packaging of claim 1, wherein the further monomer (d) is at least one selected from the group consisting of a $C_5$-$C_{20}$ alkyl(meth)acrylate, a vinyl ester of carboxylic acid comprising up to 20 carbon atoms, a vinylaromatic having up to 20 carbon atoms, an ethylenically unsaturated nitrile other than acrylonitrile, a vinyl halide, a vinyl ether of an alcohol comprising 1 to 10 carbon atoms, an aliphatic hydrocarbon having 2 to 8 carbon atoms and one or two double bonds.

8. The packaging of claim 1, wherein the aqueous polymeric dispersion further comprises a platelet-shaped pigment and in an amount of up to 1 part by weight per 1 part by weight of the polymers A and B.

9. The packaging of claim 1, wherein the coating has a coat weight of 20 to 25 g/m² on paper.

10. The packaging of claim 1, wherein the aqueous polymeric dispersion comprises 15 to 75 wt % of the mixture of the at least two polymers A and B.

11. The packaging of claim 1, wherein the polymer B comprises, in reacted form:
    (a) 50 to 90 wt % of an acrylate monomer that is a $C_1$-$C_{20}$ alkyl(meth)acrylate;
    (b) 0.1 to 10 wt % of at least one acid monomer;
    (c) 0 to 20 wt % of a vinylaromatic;
    (d) 0 to 20 wt % of (meth)acrylonitrile; and
    (e) 0 to 10 wt % of a further monomer other than the monomers (a) to (d).

12. The packaging of claim 1, wherein the barrier layer is situated as a coating on at least one side of an inner bag situated in the packaging, and the inner bag comprises a polyolefin.

13. The packaging of claim 1, wherein the barrier layer is from 2 to 30 μm in thickness.

14. A process for producing the packaging of claim 1, the process comprising applying the aqueous polymeric dispersion to a packaging substrate or to a surface of an inner bag, and drying the aqueous polymeric dispersion.

15. The packaging of claim 1, wherein the aqueous polymeric dispersion comprises 40 to 60 wt % of the mixture of the at least two polymers A and B.

16. The packaging of claim 1, wherein the polymer B comprises, in reacted form:
    (a) 70 to 90 wt % of an acrylate monomer that is a $C_1$-$C_{20}$ alkyl(meth)acrylate;
    (b) 1 to 5 wt % of at least one acid monomer;
    (c) 5 to 20 wt % of a vinylaromatic;
    (d) 5 to 20 wt % of (meth)acrylonitrile; and
    (e) 0 to 10 wt % of a further monomer other than the monomers (a) to (d).

17. The packaging of claim 16, wherein the acid monomer (b) is acrylic acid, methacrylic acid, or a mixture of both.

18. The packaging of claim 16, wherein the vinylaromatic (c) is styrene.

19. The packaging of claim 16, wherein the (meth)acrylonitrile (d) is acrylonitrile.

20. The packaging of claim 1, wherein the permeability to gaseous n-hexane is less than 10 g/m² d at 23° C.

21. The packaging of claim 1, wherein the permeability to gaseous n-hexane is less than 5 g/m² d at 23° C.

22. The packaging of claim 1, wherein the permeability to gaseous n-hexane is less than 1 g/m² d at 23° C.

23. Paper or cardboard packaging produced at least partly from recycled paper contaminated with mineral oil, wherein the packaging comprises at least one barrier layer obtained by applying an aqueous polymeric dispersion comprising a mixture of at least two polymers A and B, wherein polymer A is a copolymer obtained by emulsion polymerization of:
    (a) one or more principal monomers that are $C_1$-$C_4$ alkyl (meth)acrylates,
    (b) 0.1 to 5 wt % of one or more acid monomers,
    (c) 0-20 wt % of acrylonitrile and
    (d) 0 to 10 wt % of a further monomer other than the monomers (a) to (c),
    polymer B is a copolymer obtained by emulsion polymerization of one or more principal monomers selected from $C_1$ to $C_{20}$ alkyl(meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, and optionally, other monomers copolymerizable therewith,
    wherein a glass transition temperature of polymer A is greater than +45° C., a glass transition temperature of polymer B is less than +10° C., and a mean value calculated from the glass transition temperatures of the individual polymers is in a range from +10 to +45° C.,
    wherein
    the barrier layer is situated on one or more outermost surfaces of the packaging,
    the barrier layer is at least an outermost layer of multiple layers of a multilayered packaging coating, or
    the barrier layer is situated as a coating on an outermost surface of an inner bag situated within the packaging, and
    wherein the coating has a permeability to gaseous n-hexane of less than 50 g/m² d at 23° C.

* * * * *